United States Patent Office 3,046,197
Patented July 24, 1962

3,046,197
NON-ANTIGENIC PROTEIN AND FAT COMPOSITION AND METHOD OF PREPARATION
Frederick R. Harper, Denver, Colo., assignor to Vernon F. Taylor, Jr., Denver, Colo.
No Drawing. Filed June 19, 1958, Ser. No. 743,009
3 Claims. (Cl. 167—66)

My application for patent is a continuation-in-part of my copending application Ser. No. 575,740, filed April 3, 1956, now abandoned, entitled Chyloadiaphoric Serium and Method; which, in turn, is a continuation-in-part of my application Ser. No. 545,428, filed November 7, 1955, now abandoned. The invention is concerned with the provision of a non-antigenic, non-reactive and non-toxic solution of whole protein and fat which is suited to parenteral nutrition of humans, and also to a method of preparing the same, largely from animal blood.

Among the objects of my invention is the provision of a solution of whole protein and fat which is suited for injection into human beings at times when the intake of foodstuffs by the normal route is interdicted because of disease, trauma, malnutrition or temporary disability incident to surgical operation or other operative or non-operative therapeutic procedure, this without danger of pyrogenic reaction, hemoglobinuria, anaphylaxis or other untoward reaction; which product is efficiently and reliably produced from readily available products, principally including the blood of such animals as cattle, horses, swine, sheep, and the like; and which product may be shipped and stored over long periods of time without in any way adversely affecting its efficacy.

Other objects of my invention, as well as the various advantages thereof, in part will be obvious and in part pointed out during the course of the description which follows.

Accordingly, my invention may be considered to reside in the combination of elements, mixture of materials and composition of ingredients, and in the several procedural steps and the relation of each of the same to one or more of the others, the scope of the useful application of all of which is more fully set forth in the claims at the end of this specification.

As conducive to a better understanding of my invention it may be noted at this point that there is great demand for a preparation containing fat or other lipoid material which is compatible with human blood and which can be readily and safely introduced into human beings. Moreover, this demand requires ready availability of such a preparation in substantial quantities and at reasonable cost.

In comparatively recent years the entire medical profession has sought a preparation which could be administered by vein to persons who by reasons of disease, trauma, operation, or other operative or non-operative therapeutic manipulation precludes them from ingesting food in the normal fashion. For in such persons the debilitating effect of starvation even for relatively short periods of time has been repeatedly shown by careful metabolic studies. Where the diseased, traumatized and operated human patients have been unable to ingest anything or have been able to receive only an inadequate supply of various foods and their califoric content, the debilitating effect is immediately recognized.

And although demands have been made in the prior art to formulate a preparation of fat which could be safely injected into the human patient, these attempts have not been succesful. Unfortunately, it appears that there results molecular aggregates which are of such a large size as to produce various evidences of toxic reaction. Moreover, the prior art preparations are found to be of short shelf life, this as a result of a marked tendency of the constituent substances to either separate into their original form or to recombine to form similar objectionable and undesirable products.

Accordingly, therefore, one of the more important objects of my invention is to provide a serum of whole protein and fat which possesses excellent shelf-stability for long periods of time without separation of constituents and which serum may be administered to human beings without any evidence of embolic, coagulative or other toxic or noxious reactions on the part of the human recipient. A further object is the provision of a simple, direct, effective, and thoroughly reliable method of producing the serum, this employing comparatively few manipulative steps and making use of inexpensive and readily available raw materials.

Referring now more particularly to the practice of my invention, I first prepare an adiaphoric serum generally described in my companion application for patent, Ser. No. 533,215, filed September 8, 1955, now abandoned, and more especially as described and claimed in my copending companion application Ser. No. 730,709, filed April 24, 1958, entitled Blood Product and Method. This serum conveniently is prepared from animal blood, such for example, as that of cattle, sheep, swine, horses, and the like. And in preparation of that serum the blood is collected from young, healthy animals, all in advance of slaughter and under sterile conditions.

The blood is collected directly into a sterile vessel or, as desired, in a sterile solution of sodium citrate; where directly collected it is permitted to clot and stand at room temperature for about 2 hours, following which it is refrigerated for some 6 to 72 hours. Similarly, where collected in sodium citrate solution it is allowed to stand and then refrigerated, as noted. In both cases the sediment which is composed principally of blood cells precipitates out, leaving a supernatant layer of serum.

As a next step, the serum is carefully withdrawn from the cellular component in aseptic manner. It remains to render this fluid entirely compatible with human blood so that with safety it may be injected into human beings as a blood expander.

I now convert the protein molecule of the serum with one or more selected proteolytic enzyme which, during process akin to fermentation, produce such changes in the proteins as to convert them into smaller bodies. Pepsin is the proteolytic enzyme which I prefer to employ. And I prefer to use crystalline pepsin which has been dissolved in a suitable solvent, say a sufficient quantity of N/10 HCl.

Pepsin, I find, carries out its intended function of protein conversion only when set in an acid environment. According, to the treated raw beef serum, or treated serum from other suitable animal, or animals, I bring the pH value to 1.9 through the addition of a sufficient quantity of 2 N HCl. Usually for each liter of treated serum, this acidity is achieved through the addition of from 70 to 74 ml. of the 2 N HCl. With this acidity the treated serum is conditioned for conversion through incubation in pepsin.

For proper digestion of the protein content of the serum I now add 200 mg. of crystalline pepsin which has been dissolved in 50 mg. of N/10 HCl and allow this mixture to stand for approximately 45 minutes to one hour at a temperature between 20° C. and 40° C., 25° C. usually being found preferable. Variation in temperature largely controls not only the molecular size of the protein, but as well the colloid osmotic pressure and the viscosity of the final product. Higher colloid osmotic pressure accompanies higher temperatures. And with elevated temperatures a protein of lower molecular weight is achieved.

Following reaction of the treated beef serum with pepsin under the incubation treatment just disclosed, I wash it with an aqueous solution of formaldehyde, this after bringing the pepsin-converted serum to near neutrality, say pH 7.5, through the addition of 5 normal sodium hydroxide (5 N NaOH). After thorough intermixture, followed by filtering to remove all sediment, I produce a fluid product conditioned for reaction with formaldehyde.

For each liter of the buffered fluid, I add about 10 ml. of 37% aqueous solution of formaldehyde. Incubation, with further conversion of the solute protein molecule of the serum, is conducted at room temperature for approximately 3 hours. Where desired, a shaker or the like is employed for such gentle agitation as to insure thorough and homogeneous intermixture. Formaldehyde incubation can of course be varied widely, say from between 5 minutes up to as long as 72 hours.

I now add ammonia water in an amount of approximately 0.1% by volume through the addition, with constant stirring, of about 10 ml. of concentrated $NH_4OH$ with a specific gravity of 0.88. This step is followed immediately through the addition of sufficient 5 normal sodium hydroxide to render the solution strongly alkaline with pH value of about 9.5. I accomplish this through the addition, by liter of formaldehyde-reacted serum, of about 10 ml. of 5 N NaOH.

It is at this stage, under treatment by formaldehyde in the presence of heat, as well as in the prior buffering phase, that the activity of the pepsin enzyme is brought to final destruction. Typically, I achieve this by heating the formaldehyde-digested serum at a temperature ranging from about 90° C. to about 95° C. for a period of about 30 minutes. Actually I have found that the formaldehyde starts its destruction of the agglutination factor at about 35° C. And by starting at that temperature and thereafter progressively increasing the temperature quickly to the range indicated, thereupon holding the product at that tempertaure for about 30 minutes, it is ensured that through destruction of this agglutination factor or factors occurs. Any or all other specific chemical factors which may be present in the animal blood and which render the admixture of cell-free animal blood incompatible with human blood are likewise destroyed. I observe, following this treatment, that no precipitate is cast down as a result of the treatment. Thus the formaldehyde additive prevents gelation of the serum and coagulation thereof upon exposure to heat at pH 9.5. Any excess formaldehyde is converted by the ammonia which is present, into harmless hexamine.

The product is now buffered with 2 HCl down to pH 7.2, about 20 ml. of 2 N HCl being required per liter of serum to bring about the neutralization. This, I conveniently designate adiaphoric serum.

And in accordance with my invention, the adiaphoric serum in the amount of about 900 ccs. is brought to a temperature of about 85° to 95° C. At this point there is added sufficient lard oil to give desired strength. For the proportion of serum illustratively given I use about 5% to 20% by volume of lard oil, that is, 45 to 180 ccs. of the lard oil.

The mixture of the hot serum and the lard oil is introduced into a suitable homogenizer and run through homogenizer some five or six times at pressures on the order of 3200 to 3500 pounds per square inch.

Following homogenation, the mix is then filtered through a Seitz K 7 filter (1 to 2 microns) into an evacuated, sterile, non-pyrogenic bottle. The temperature of the serum is allowed to drop to room temperature, following which it is ready for intravenous injection into humans.

I find that injection is had with no more difficulty, and with no more reaction, than when ordinary blood plasma of human origin is injected into the human subject.

The distinctive character of the serum of my invention is demonstrated not only by its successful administration to humans and to animals, as well, where desired, but by the circumstance that caloric balance can be maintained in man and animal by use of this material without reaction or toxic change. The serum of my invention admirably satisfies the pressing needs of the medical profession for a lipoid adjuvant possessing certainty of availability, low cost of production, full compatibility with the blood of man, a compatibility rivalling that of the blood of one man when injected into another, along with a long storage life. Actually, I find that the serum of my invention may be stored for long periods of time with only an occasional precipitation of fibrin threads which are easily removed by filtration. No other harmful effect attends the long storage and subsequent use of the serum.

I find that the chyloadiaphoric serum of my invention represents a combination of fat and protein which is not merely a simple emulsion of the two. On the contrary, it represents a loose physical chemical adsorptive agglomeration.

The utility of the product of my invention has been demonstrated by administration to human patients of the four different blood groups. Before undertaking administration, however, I made a series of tests of the erythrocytes of patients of these four blood groups. In no case was there observed any agglomeration or hemolysis of the red cell. And additionally, prior to human administration, I tested the antigenic activity of my serum on guinea pigs, this without any resulting evidence of antigenicity.

Administration to the human patients was accomplished without untoward incident and without evidence of pyrogenesia or hemoglobinuria. Following several repeated potentially anaphylactic challenging doses, no evidence of anaphylaxis or other untoward reaction was noted. And the administrations were found to supply the desired caloric requirements in effective manner.

Thus, in the practice of my invention I provide a serum and a method of preparing the same in which the various objects of my invention hereinbefore set forth are fully achieved. The product is readily produced from available and comparatively inexpensive materials, is safely stored, and is easily, safely and efficaciously used.

Since many embodiments of my invention will readily suggest themselves to those skilled in the art, once the broad aspects my my invention are disclosed, and since many modifications of the present embodiment will likewise come to mind, I intend the foregoing disclosure to be purely by way of illustration and not by way limitation.

I claim as my invention:

1. In the production of a non-antigenic, non-reactive non-toxic solution of whole protein and fat for injection into humans, the method which comprises preparing an adiaphoric serum from animal blood serum by rendering the serum acid to about pH 1.9 through the addition of hydrochloric acid and converting the solute protein content of the serum by digestion with pepsin at a temperature of about 20° to 40° C. for about 45 to 60 minutes; thereafter buffering the pepsin-treated serum to about pH 7.5 with sodium hydroxide and incubating the buffered serum in the presence of formaldehyde at room temperature for about 5 minutes to 72 hours; next destroying the agglutination factor and other antigenic factors of the treated serum by adding concentrated ammonia water thereto and sodium hydroxide to about pH 9.5 and reacting the serum at about 90° to 95° C. for about 30 minutes; buffering to about pH 7.2 with hydrochloric acid; adding lard oil in the amount of 5% to 20% by volume of serum; homogenizing the same at a pressure of 3200 to 3500 p.s.i.; and filtering.

2. In the production of a non-antigenic, non-reactive, non-toxic solution of whole protein and fat for injection into humans, the method which comprises preparing an adiaphoric serum of whole protein from the blood of the group of animals consisting of horses, swine, and sheep by rendering the serum acid to about pH 1.9 through the addition of hydrochloric acid and converting the solute protein content of the serum by digestion with pepsin at a temperature of about 20° to 40° C. for about 45 to 60 minutes; thereafter buffering the pepsin-treated serum to about pH 7.5 with sodium hydroxide and incubating the buffered serum in the presence of formaldehyde at room temperature for about 5 minutes to 72 hours; next destroying the agglutination factor and other antigenic factors of the treated serum by adding concentrated ammonia water thereto and sodium hydroxide to about pH 9.5 and reacting the serum at about 90° to 95° C. for about 30 minutes; buffering to about pH 7.2 with hydrochloric acid; adding thereto lard oil in the amount of 5% to 20% by volume of serum; homogenizing the same at a temperature of about 85° to 95° C. and at a pressure of 3200 to 3500 p.s.i.; and filtering with a filter of 1 to 2 micron filter size.

3. As a new product, a non-antigenic, non-reactive, non-toxic solution of whole protein and fat comprising an adiaphoric serum formed from blood serum of an animal by pepsin incubation of the blood serum at about 20° to 40° C. for about 45 to 60 minutes at about pH 1.9 followed by buffering to pH 7.5 with NaOH and incubation at room temperature for some 5 minutes to 72 hours in the presence of formaldehyde, then adding $NH_4OH$, alkalizing to about pH 9.5 with NaOH and heating at 90° to 95° C. for some 30 minutes to destroy the activity of the pepsin enzyme and antigenic factors, and buffering down to about pH 7.2 with HCl; and lard oil in the amount of 5% to 20% by volume of blood serum, the whole being emulsified and homogenized at a temperature of 85° to 95° C. and at a pressure of about 3200 to 3500 p.s.i., and filtered.

References Cited in the file of this patent

UNITED STATES PATENTS 2,728,706     Barsky _____ Dec. 27, 1955

OTHER REFERENCES

Science, 97:2512, February 19, 1943, pp. 10 and 12.
Melka: The Lancet, September 13, 1947, pp. 382, 383.
Boesen: The Lancet, February 28, 1948, pp. 325–327.
Gutfreund: Biochem. J. 39:2, 1945, pp. 186–188.
J.A.M.A. 147:7, October 13, 1951, pp. 658–660.
Ser. No. 360,386, Grandel (A.P.C.), published April 20, 1943.
Dunham: Archs. of Surg., vol. 48, 1944, pp. 395–397.
Shafiroff: Science, vol. 106, November 14, 1947, pp. 474, 475.
Meng: J. Lab. and Clin. Med., vol. 33, 1948, pp. 689–701.
Pro. Soc. Exptl. Biol. and Med., vol. 70, 1949, p. 344.
Freeman: Progress in the Chem. of Fats and Other Lipids, Holman et al., vol. 3, 1955, pp. 2–17.
Haurowitz: Chem. and Biol. of Proteins, Academic Press, N.Y., 1950, p. 290.
The Enzymes, Academic Press, vol. 2, part 2, 1952, p. 1330.
Blood and Plasma Proteins, Their State in Nature, Academic Press, N.Y., 1953, p. 184.
Sumner: Chem. and Methods of Enzymes, Academic Press, N.Y., 3rd ed., 1953, pp. 16–29, 48, 49, 166–169.